Sept. 9, 1952  J. H. WERNIG  2,609,561
WINDSHIELD WIPER
Filed July 26, 1946  2 SHEETS—SHEET 1
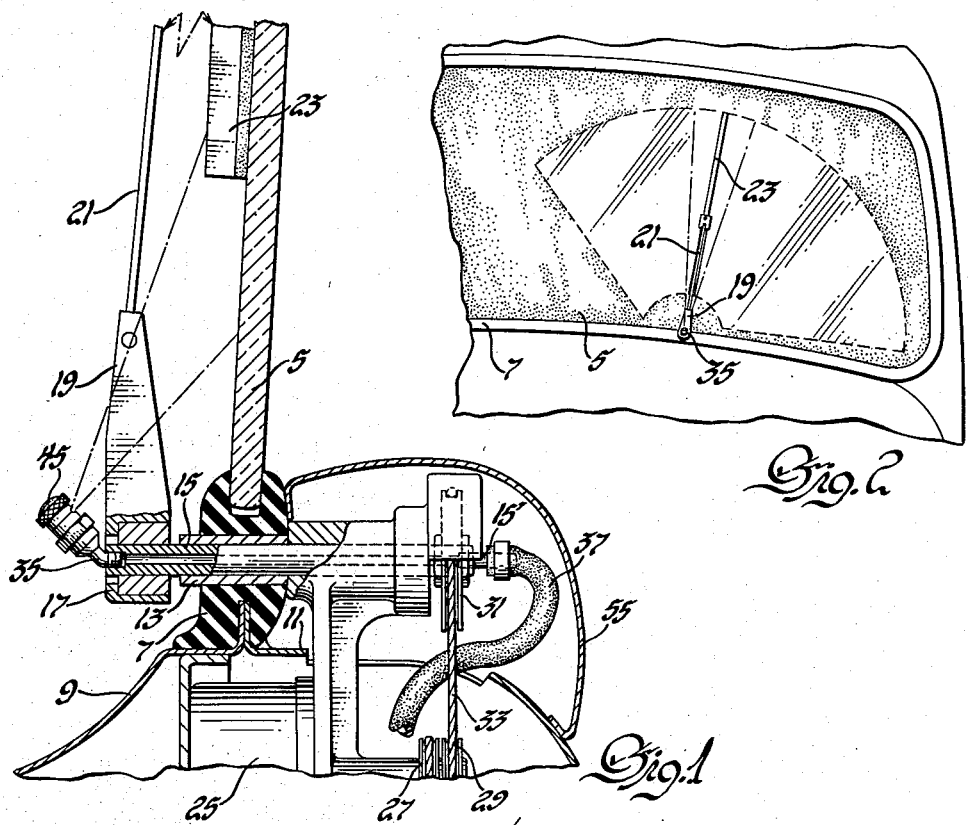
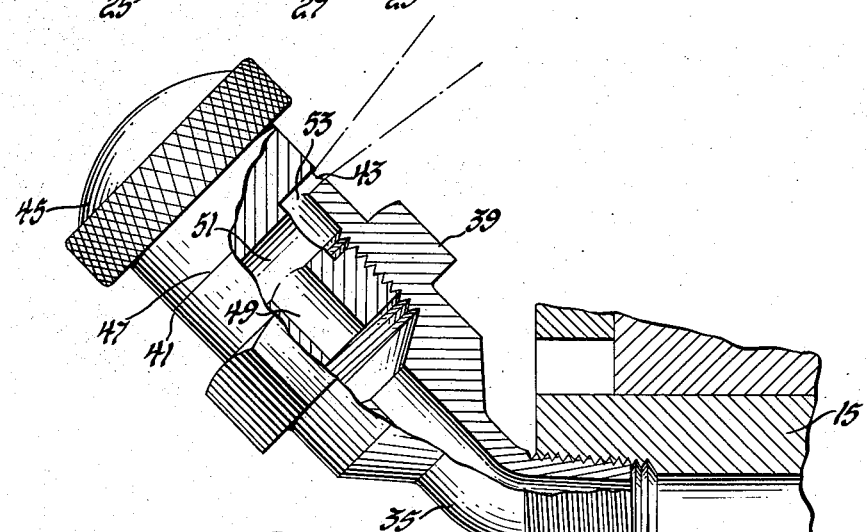
Inventor
James H. Wernig
By Blackmor, Lemen & Flint
Attorneys Sept. 9, 1952  J. H. WERNIG  2,609,561
WINDSHIELD WIPER
Filed July 26, 1946  2 SHEETS—SHEET 2
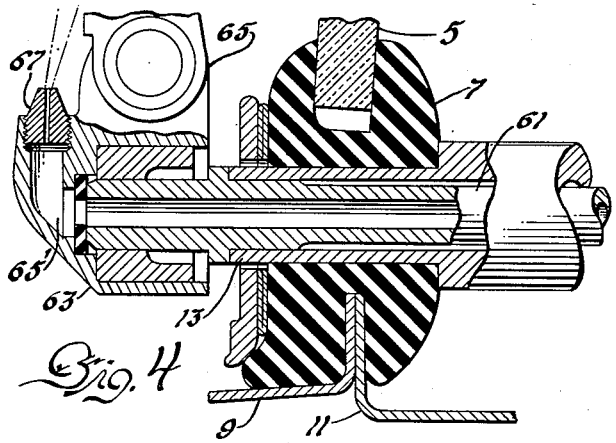
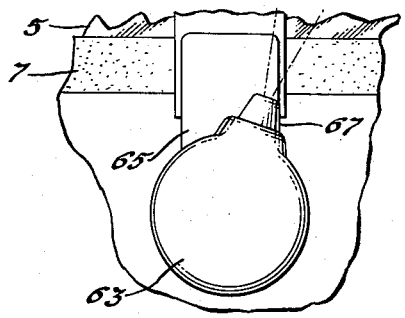
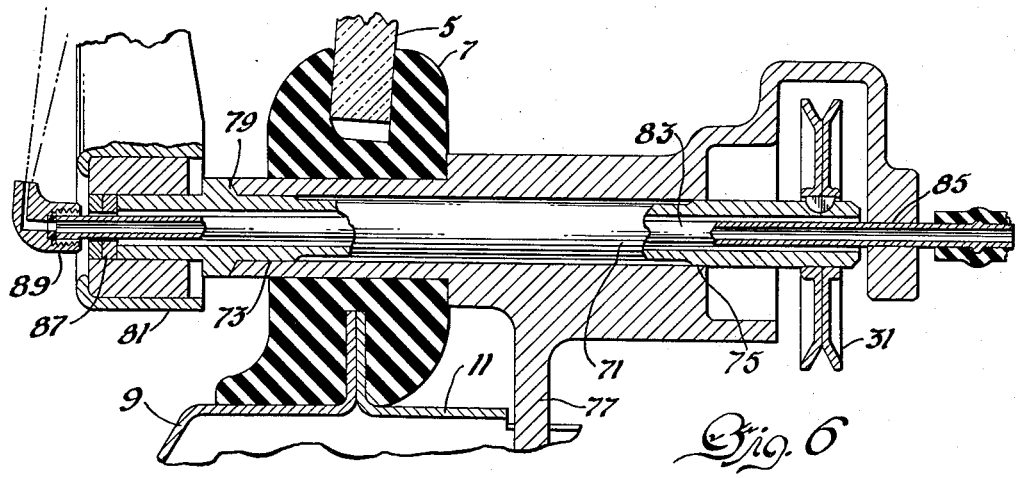
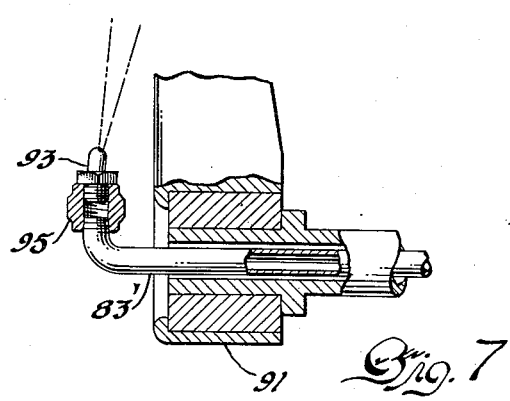
Inventor
James H. Wernig
By Blackmore, Smeer & Hiert
Attorneys Patented Sept. 9, 1952

2,609,561

UNITED STATES PATENT OFFICE 2,609,561

WINDSHIELD WIPER

James H. Wernig, Detroit, Mich., assignor to General Motors Corporation, Detroit, Mich., a corporation of Delaware Application July 26, 1946, Serial No. 686,544

7 Claims. (Cl. 15—250.4)

1

This invention relates to windshield cleaners for motor vehicles.

The object of the invention is the provision of means to deliver water or any preferred cleaning liquid to the surface of the glass.

A further object is to provide means for delivering the fluid from jets located adjacent the axis of rotation of the wiper arm and movable therewith, the jets in one form arranged to deliver the fluid on both sides of the blade.

Other objects and advantages including simplicity and economy in the manufacture of the parts will be understood from the description which follows.

On the drawing:

Fig. 1 is a vertical section through the novel glass cleaning expedient.

Fig. 2 is a view facing the windshield showing the cleaner in operation.

Fig. 3 is a vertical section of the nozzle and adjacent parts.

Fig. 4 shows in vertical section a modification.

Fig. 5 is a view in elevation of this modification.

Fig. 6 is a vertical section of a third form in which the invention may be embodied.

Fig. 7 is a similar section of still another form.

Numeral 5 is applied to a conventional motor vehicle windshield. At its base is a seal 7 of rubber or the like. The rubber seal is supported by metal parts 9 and 11 constituting usual body parts.

Extending through the rubber seal is a sleeve 13 serving as a bearing for a rockshaft 15. On the end of rockshaft 15 is secured the hub or end 17 of an arm 19 which, together with arm member 21, carries the blade 23 which oscillates back and forth over the glass in response to the rocking of the rockshaft.

There is shown at 25 a power source or motor. It is of such a kind that it reversely rotates pulleys 27 and 29. Pulley 29 is connected to a pulley 31 on shaft 15 by a driving belt 33. The belt on pulley 27 may be used to operate a second wiper assembly not shown.

Shaft 15 is tubular and threaded into its end is a fitting 35. The other end of tubular shaft 15 is coupled by a fitting 15' to a tube 37 of rubber or an equivalent. Tube 37 is to be connected to any convenient source of fluid under pressure such as a reservoir. There will be a control valve provided for admitting the fluid from the reservoir to the hollow shaft 15. Such a reservoir and valve have been heretofore proposed and since no novelty in these elements is being claimed they are not shown.

2

The fitting 35 terminates in an external nut formation 39 to facilitate its assembly with the end of shaft 15. It extends somewhat beyond the nut formation to an upper edge 41 within which are spaced radial passages 43 in its wall. A cap or plug 45 is threaded into fitting 39 until an outer flange thereof at 47 reaches edge 41. The plug 45 has an axial passage 49 communicating with a space 51. The space 51 communicates by means of a recess 53 with the radial passages 43. These radial passages are arranged one on each side of the arm so that the stream of liquid is delivered a few degrees on each side of the blade. In this way water from one jet loosens particles on the glass just prior to the contact of the particles by the wiper blade. Any particles loosened by the blade but which are left behind may be washed down by the water from the second jet.

The rubber tube and pulley assembly may be housed as shown at 55.

When it is desired to operate the windshield wiper the shaft 15 is rocked as explained above. If it be found desirable to spray the glass, it is only necessary to admit the fluid through the hollow shaft. As the shaft oscillates the rubber tube twists sufficiently to accommodate the rocking of the shaft. The two jets travel with the blade arm and always supply the stream of liquid where needed, thus avoiding wasting and available supply.

In the form of invention shown by Fig. 4, the rockshaft 61 carries the hub 63 of the wiper arm 65. As before, the rockshaft 61 is tubular to carry the cleaning fluid. Instead of the nozzle structure 35 I extend the hub 63 outwardly to some extent to provide a space 65' into which I thread a simple nozzle 67 having a single opening for the discharge of fluid, the nozzle extended at an angle to the arm as shown by Fig. 5. In this form as in the other, the nozzle rocks with the arm but a single stream only is used. To remove the arm hub it is not necessary to remove the nozzle as in the form shown by Fig. 1 because of the unitary characteristic of hub and nozzle.

Fig. 6 shows a form wherein the rockshaft 71 is rotatably supported at 73 and 75 in the bearing bracket 77. It has a tapered flange 79 engaging a bracket abutment. Beyond the flange 79 there is fitted to the rockshaft the hub 81 of the wiper arm. Extending through the hollow rockshaft is a non-rotatable liquid carrying tube 83 supported on the bracket at one end 85. Its other end is supported by a bearing member 87 in the hub at the end of the rockshaft. Secured on the end of tube 83 is the angular nozzle 89 with an outlet from which liquid may be discharged to the windshield. Fig. 7 shows a slight difference. It lacks the support for the tube 83' in the hub 91 of the arm and the nozzle is formed by bending up the end of the tube 83' and coupling a discharge jet 93 by a coupling 95.

I claim:

1. In a windshield cleaner, a tubular rockshaft, an arm and blade carried thereby, means including a collar surrounding said rockshaft adjacent the outer end thereof, connecting said arm to the outer end of said rockshaft, an axial passage in said rockshaft, conduit means connecting a fluid source to said passage, a jet fitting secured at the outer end of said rockshaft, said jet fitting consisting of one part secured to said rockshaft and having an axial bore connected to said axial passage, said fitting part having an annular surface surrounding said bore, a second fitting part secured to said first part and having an annular surface engaging the annular surface on said first part, and a radial groove in one of said annular surfaces connected to said axial bore to provide a spray nozzle.

2. In a windshield cleaner, a tubular rockshaft, an arm and blade carried thereby, means including a collar surrounding said rockshaft adjacent the outer end thereof, connecting said arm to the outer end of said rockshaft, an axial passage in said rockshaft, flexible conduit means coaxially secured to the inner end of said rockshaft and connecting a fluid source to said passage, a jet fitting secured at the outer end of said rockshaft, said jet fitting consisting of one part secured to said rockshaft and having an axial bore connected to said axial passage, said fitting part having an annular surface surrounding said bore, a second fitting part secured to said first part and having an annular surface engaging the annular surface on said first part, and a radial groove in one of said annular surfaces connected to said axial bore to provide a spray nozzle.

3. In a windshield cleaner, a tubular rockshaft, an arm and blade carried thereby, means including a collar surrounding said rockshaft adjacent the outer end thereof, connecting said arm to the outer end of said rockshaft, an axial passage in said rockshaft, flexible conduit means coaxially secured to the inner end of said rockshaft and connecting a fluid source to said passage, drive means connected to said rockshaft between said inner and outer ends, a jet fitting secured at the outer end of said rockshaft, said jet fitting consisting of one part secured to said rockshaft and having an axial bore communicating with said axial passage, said fitting part having an annular surface surrounding said bore, a second fitting part threaded to said first part and having an annular surface engaging the annular surface on said first part, and a radial groove in one of said annular surfaces connected to said axial bore to provide a spray nozzle which may be cleaned by rotating said second part with respect to said first part.

4. In a windshield cleaner, a tubular rockshaft, an arm having a spring-biased hinge joint adjacent the rockshaft end, a blade carried by the other end of said arm, means including a collar surrounding said rockshaft adjacent the outer end thereof, connecting said arm to the outer end of said rockshaft, an axial passage in said rockshaft, flexible conduit means coaxially secured to the inner end of said rockshaft and connecting a fluid source to said passage, drive means connected to said rockshaft between said inner and outer ends, a jet fitting secured at the outer end of said rockshaft, said jet fitting consisting of one part axially located and secured in said axial passage of the rockshaft and having an axial bore communicating with said axial passage, said fitting extending along the outer side of said arm and terminating short of said hinge joint so that the wiper arm may be bent backward to remove the blade, said fitting part having an annular surface surrounding said bore, a second fitting part threaded to said first part and having an annular surface engaging the annular surface on said first part, and a radial groove in one of said annular surfaces connected to said axial bore to provide a spray nozzle which may be cleaned by rotating said second part with respect to said first part.

5. In a windshield cleaner a windshield wiper mounting having a bore extending from the outside to the inside of the windshield, a tubular rockshaft oscillatably disposed in said bore, and having a wiper arm securing means at its outer end and a wiper arm thereon, a stub jet nozzle carried by the outer end of said rockshaft and oscillatable with it and having means for ejecting fluid into the field of movement of the blade and along a path angularly disposed to the axis of said blade, and means for supplying fluid to the inside end of said tubular rockshaft and thence to said nozzle.

6. The invention defined by claim 5 in which the stub jet nozzle mounting is carried by a part formed integrally with the wiper arm securing means.

7. The invention defined by claim 5 in which the stub jet nozzle consists of a single angular member attached to a fluid tube passing through the tubular rockshaft and connected to the fluid supply.

JAMES H. WERNIG.

REFERENCES CITED

The following references are of record in the file of this patent:

UNITED STATES PATENTS

| Number | Name | Date |
|---|---|---|
| 1,738,884 | Gearhart | Dec. 10, 1929 |
| 1,801,373 | Stevens | Apr. 21, 1931 |
| 1,857,419 | Williams | May 10, 1932 |
| 2,178,068 | Cordova | Oct. 31, 1939 |
| 2,289,650 | Horton | July 14, 1942 |
| 2,326,349 | Fuller | Aug. 19, 1943 |
| 2,388,500 | Schaal | Nov. 6, 1945 |